US008340278B2

(12) United States Patent
Gowreesunker et al.

(10) Patent No.: US 8,340,278 B2
(45) Date of Patent: Dec. 25, 2012

(54) METHOD AND APPARATUS FOR CROSS-TALK RESISTANT ADAPTIVE NOISE CANCELLER

(75) Inventors: Baboo Vikrhamsingh Gowreesunker, Addison, TX (US); Takahiro Unno, Richardson, TX (US); Muhammad Zubair Ikram, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 257 days.

(21) Appl. No.: 12/900,143

(22) Filed: Oct. 7, 2010

(65) Prior Publication Data

US 2011/0123019 A1 May 26, 2011

Related U.S. Application Data

(60) Provisional application No. 61/263,010, filed on Nov. 20, 2009.

(51) Int. Cl.
*H04M 9/08* (2006.01)
(52) U.S. Cl. .............. 379/406.09; 379/406.03
(58) Field of Classification Search ........... 379/406.09, 379/406.03, 406.01, 406.02, 406.08
See application file for complete search history.

(56) References Cited

U.S. PATENT DOCUMENTS

| 8,050,201 | B2* | 11/2011 | Kahrizi et al. ........... 370/282 |
| 2007/0121926 | A1* | 5/2007 | Le Gall et al. ......... 379/406.01 |
| 2009/0060167 | A1* | 3/2009 | Deng et al. ............. 379/406.08 |
| 2009/0129584 | A1* | 5/2009 | Aoyagi et al. .......... 379/406.06 |
| 2009/0245502 | A1* | 10/2009 | Liu .......................... 379/406.08 |
| 2009/0257579 | A1* | 10/2009 | Takada ..................... 379/406.08 |
| 2011/0058667 | A1* | 3/2011 | Takada ..................... 379/406.08 |
| 2011/0085656 | A1* | 4/2011 | Usman et al. ............ 379/406.08 |
| 2011/0261950 | A1* | 10/2011 | Yamaguchi .............. 379/406.08 |

OTHER PUBLICATIONS

Al-Kindi, M.J., Dunlop, J. "Improved Adaptive Noise Cancellation in the Presence of Signal Leakage on the Noise Reference Channel", Signal Processing, v 17, n 3, Jul. 1989, p. 241-250.

Gerven, S. Van, Compernolle, D. Van "Signal Separation by Symmetric Adaptive Decorrelation: Stability, Convergence and Uniqueness," IEEE Trans. Signal Processing, vol. 43, pp. 1602-1612, 1995.

(Continued)

*Primary Examiner* — Olisa Anwah
(74) *Attorney, Agent, or Firm* — Mirna Abyad; W. James Brady; Frederick J. Telecky, Jr.

(57) ABSTRACT

A method and apparatus for cross-talk resistant adaptive noise cancellation. The method includes retrieving, via the processor, a primary signal and a reference signal, filtering the primary signal utilizing a filter $H_{12}(z)$ and estimating a cross-talk, filtering the reference signal utilizing a filter $H_{21}(z)$ and estimating the noise leakage of the reference signal, determining the difference between the noise leakage estimate from the primary signal and estimating a first post-filtering, determining the difference between the cross-talk estimate and the reference signal and estimating a second post-filtering, determining if the voice activity is detected in the primary signal, adapting filters $H_{12}$ and $H_{21}$ by de-correlation if the voice activity is detected, and adapting filter $H_{12}$ by NLMS if the voice activity is not detected, limiting maximum filter change during different conditions for protecting filters $H_{12}$ and $H_{21}$ from diverging, maintaining filter stability by tracking absolute sum of the coefficients of the convolution of $H_{12}$ and $H_{21}$, obtaining a primary output and a reference output utilizing the first post-filtering and the second post-filtering, and utilizing the primary output and the reference output for cross-talk resistant adaptive noise cancellation.

3 Claims, 7 Drawing Sheets

OTHER PUBLICATIONS

Yen, K. Zhao, Y. "Adaptive Co-Channel Speech Separation and Recogniation," IEEE Trans. Speech Audio Processing, vol. 7, pp. 138-151, Mar. 1999.

Weinstein, E., Feder, M., Oppenheim, A. V. "Multi-Channel Signal Separation by Decorrelation," IEEE Trans. Speech Audio Processing, vol. 1, pp. 405-413, Oct. 1993.

* cited by examiner

METHOD AND APPARATUS FOR CROSS-TALK RESISTANT ADAPTIVE NOISE CANCELLER

CROSS-REFERENCE TO RELATED APPLICATIONS

This application claims benefit of U.S. provisional patent application Ser. No. 61/263,010, filed Oct. 20, 2009, which is herein incorporated by reference.

BACKGROUND OF THE INVENTION

1. Field of the Invention

Embodiments of the present invention generally relate to a method and apparatus for cross-talk resistant adaptive noise canceller.

2. Description of the Related Art

The classical Adaptive Noise Canceller (ANC) consists of 2 sensors, a primary sensor and a reference sensor, where the primary sensor consist of a desired signal corrupted with noise and the reference channel is assumed to be predominantly noise. The classical ANC employs anyone of many adaptive filter methods such as the Normalized Least Mean Square (NLMS), or Affine Projection (AP), to adaptively remove the noise from the primary channel.

In portable electronics system such as mobile phones, the sensors (microphones) tend to be close together and the reference sensor usually contains both noise and some leaked desired signal (speech). This phenomenon where the desired signal is leaked into the reference channel is known as cross-talk and this can cause distortion of the speech at the output of an ANC.

Therefore, there is a need for an improved cross-talk resistant adaptive noise canceller.

SUMMARY OF THE INVENTION

Embodiments of the present invention relate to a method and apparatus for cross-talk resistant adaptive noise cancellation. The method includes retrieving, via the processor, a primary signal and a reference signal, filtering the primary signal utilizing a filter $H_{12}(z)$ and estimating a cross-talk, filtering the reference signal utilizing a filter $H_{21}(z)$ and estimating the noise leakage of the reference signal, determining the difference between the noise leakage estimate from the primary signal and estimating a first post-filtering, determining the difference between the cross-talk estimate and the reference signal and estimating a second post-filtering, determining if the voice activity is detected in the primary signal, adapting filters $H_{12}$ and $H_{21}$ by de-correlation if the voice activity is detected, and adapting filter $H_{12}$ by NLMS if the voice activity is not detected, obtaining a primary output and a reference output utilizing the first post-filtering and the second post-filtering, and utilizing the primary output and the reference output for cross-talk resistant adaptive noise cancellation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A cross-talk resistant Adaptive Noise Canceller (CTR-ANC) algorithm is implemented that models the cross-talk, and its performance relative to the acoustic chain is investigated. Such a system is compared to the performance with of an Adaptive Noise Canceller (ANC) solution which employs a speech suppressor in the reference link, referred in this document as ANC 1x. In one embodiment, the solution utilizes a feed-forward design of the CTR-ANC, implemented in the time domain and in the frequency domain. The performance was evaluated by a combination of SNR computation and subjective listening tests for simulation data and real recording for various noise conditions. Furthermore, the performance of the module was also evaluated as part of the complete acoustic chain.

Figure 1:
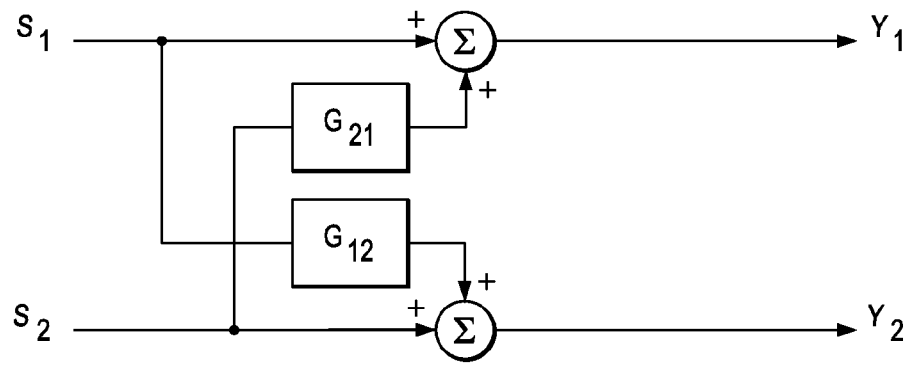
FIG. 1 is an embodiment of a model for mixing system with cross-talk.

FIG. 1 is an embodiment of a model for mixing system with cross-talk. FIG. 1 shows a model of mixtures of two sources by two sensors. Given the sources, S1 and S2, and the microphone signals Y1 and Y2, the mixing system can be represented by the following transfer function, $$\begin{bmatrix} Y_1(z) \\ Y_2(z) \end{bmatrix} = \begin{bmatrix} 1 & G_{21}(z) \\ G_{12}(z) & 1 \end{bmatrix} \begin{bmatrix} S_1(z) \\ S_2(z) \end{bmatrix} \quad (1)$$

Where $G_{21}(z)$ is an FIR filter modeling the noise leakage from the reference channel to the primary channel, and $G_{12}(z)$ is the filter modeling the speech leakage into the reference channel.

Introducing the cross-talk resistant ANC (CTR-ANC), the CTR-ANC estimates the original mixing filters, $G_{12}(z)$ and $G_{21}(z)$, and then does some inverse filtering operation to separate the sources. The algorithm may be implemented both as a feed-forward or feed-back system.

Figure 2:
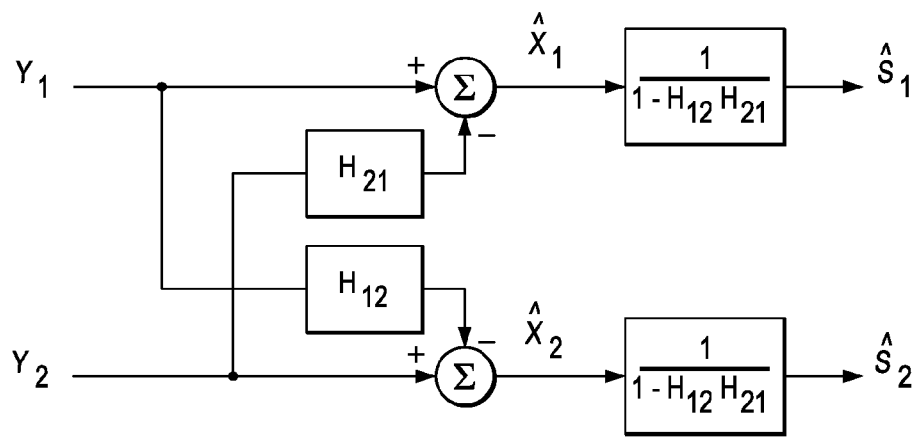
FIG. 2 is an embodiment of a cross-talk resistant adaptive noise canceller.

FIG. 2 is an embodiment of a cross-talk resistant adaptive noise canceller, which focuses on the feed-forward structure. This algorithm operates in two stages, first the sources are separated up to a shaping filter, and second they are recovered by a post-filtering operation. To illustrated the source recovery part, the transfer function for the intermediate outputs is defined, $\hat{X}_1(z)$ and $\hat{X}_2(z)$, as follows, $$\begin{bmatrix} \hat{X}_1(z) \\ \hat{X}_2(z) \end{bmatrix} = \begin{bmatrix} 1 & -H_{21}(z) \\ -H_{12}(z) & 1 \end{bmatrix} \begin{bmatrix} Y_1(z) \\ Y_2(z) \end{bmatrix} \quad (2)$$

Assuming that $H_{12}(z)$ and $H_{21}(z)$ have converged to $G_{12}(z)$ and $G_{21}(z)$, one can substitute eq (1) into eq (2) to get the following expression, $$\begin{bmatrix} \hat{X}_1(z) \\ \hat{X}_2(z) \end{bmatrix} = \begin{bmatrix} 1-H_{12}(z)H_{21}(z) & 0 \\ 0 & 1-H_{12}(z)H_{21}(z) \end{bmatrix} \begin{bmatrix} S_1(z) \\ S_2(z) \end{bmatrix}, \quad (3)$$

where, the sources would be separated at this point if the filters were properly estimated.

At the intermediate output, the sources can be estimated up to a shaping filter, determined by mixing filters of our environment. To recover the original sources, additional post-filtering operation may be needed in the second stage of the algorithm, where, for example, the intermediate outputs are processed by an IIR post-filter. This leads to following transfer function.

$$\begin{bmatrix} \hat{S}_1(z) \\ \hat{S}_2(z) \end{bmatrix} = \frac{1}{1-H_{12}(z)H_{21}(z)} \begin{bmatrix} 1-H_{12}(z)H_{21}(z) & 0 \\ 0 & 1-H_{12}(z)H_{21}(z) \end{bmatrix} \begin{bmatrix} S_1(z) \\ S_2(z) \end{bmatrix}, \quad (4)$$

Thus, the original signal at this point may be recovered, if the following condition is met $$|H_{12}(z)H_{21}(z)| < 1, \forall z \quad (5)$$

The filters $H_{12}(z)$ and $H_{21}(z)$ are estimated by de-correlating the intermediate outputs of CTR-ANC, using a steepest descent method. The time domain filter update equations are given as follows, $$h^{k+1}_{12} = h^k_{12} + \mu_1 x_2(k)\vec{x}_1(k) \quad (6)$$
$$(h^{k+1})_{21} = h^{k}_{21} + \mu_2 x_1(k)\vec{x}_2(k)$$

wherein, $\vec{x}_1$ and $\vec{x}_1$ are vectors. The step-size for each channel was normalized as follows, $$\mu = \frac{2\alpha}{N_1 \text{var}(y_1) + N_2 \text{var}(y_2)} \quad (7)$$

where N1 and N2 were the filter lengths of filters $H_{12}(z)$ and $H_{21}(z)$ respectively, and $0 < \alpha < 1$, wherein var is the variance.

Voice Activity Detector (VAD), on the primary channel, is used to determine voiced periods from non-voiced periods. During, non-voiced periods, we assumed noise only and adapt only filter $H_{21}$ and similarly during voiced period, we adapted the filter $H_{12}$. During voiced period, both speech and noise are present and theoretically, we could adapt both the filters. However, in practice the presence of speech can cause filter $H_{21}$ to diverge in this situation. With good divergence control for this situation, it is possible to adapt both filters.

In one embodiment, during voiced periods, the VAD may erroneously label a frame as not having speech. Under such conditions, the cross-talk filter, $H_{12}$, may be adapted. As mentioned above, adapting the noise filter in the presence of speech is usually done in such a way to avoid the filter from diverging. Thus, one may use some of the divergence control principles from the frequency domain AEC. In the AEC, divergence control is needed in the adaptation when there is double-talk and the near-end speech can cause the filters to diverge. In the CTR-ANC, the presence of speech during erroneous VAD decision is similar to the double-talk situation.

In one embodiment, the allowed maximum filter power change may be limited. Thus, one may, for example, use a predetermined or set of predetermined maximum filter power change that limits the divergence, and/or one may use ERLE and echo_SNR employed in the AEC to dynamically determine the maximum filter change during different conditions. Although ERLE and echo_SNR are not valid for noise reduction, their concepts are analogous to estimating the noise to speech ratio. A high level interpretation is that during periods where the noise to speech ratio is low, we may choose to limit the maximum filter change. In such situation, the constraint may need to be relaxed when the noise to speech ratio is high so convergence does not suffer. This estimation may be done during non-voiced periods.

The post-filter has a stability criterion of its own, which relates to equation (4). The sufficient condition for the stability of the post-filter is illustrated below. Define w(k) as the convolution of our two filters, $h_{12}$ and $h_{21}$.

$$w(k) = \sum_{l=0}^{N_1+N_2-2} h_{12}(k)h_{21}(k-l) \quad (8)$$

Then, a sufficient condition for the stability of the IIR filter is $$\sum_{k=0}^{N_1+N_2-2} |w(k)| < 1 \quad (9)$$

As a result, there are situations with high level of cross-talk and speech-leakage where the filter sum can grow larger than 1. As such, the overall stability of the system to recover the exact sources is more constrained than that of separating the sources. Using a post-filter, one may have to compromise the separation quality of the algorithm. In one embodiment, the maximum filter sum may be limited during the adaptation (for example, if the post-filter is to be used and our filters never fully converged under these conditions).

The interaction of the ANC and the Acoustic Echo Canceller (AEC) may be a problem. Both modules are adaptive filters and depending on which module is placed first, the second may suffer from a loss in performance, because of the time-varying nature of the first filter as it is adapting. Currently, the ANC 1x is usually used after the AEC in the acoustic chain and the echo canceller performance is not affected by the ANC 1x.

In another embodiment, the CTR-ANC is placed in front of the AEC because of the potential improvement of the AEC performance in noisy conditions.

Figure 3:
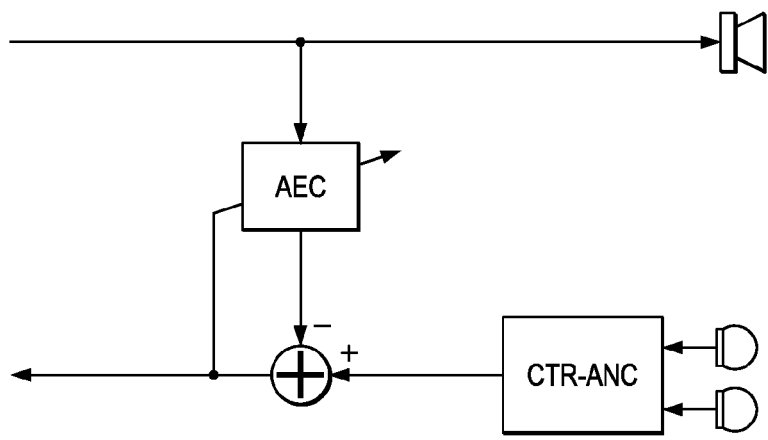
FIG. 3 is an embodiment of a cross-talk resistant adaptive noise canceller in an acoustic chain.
Figure 4:
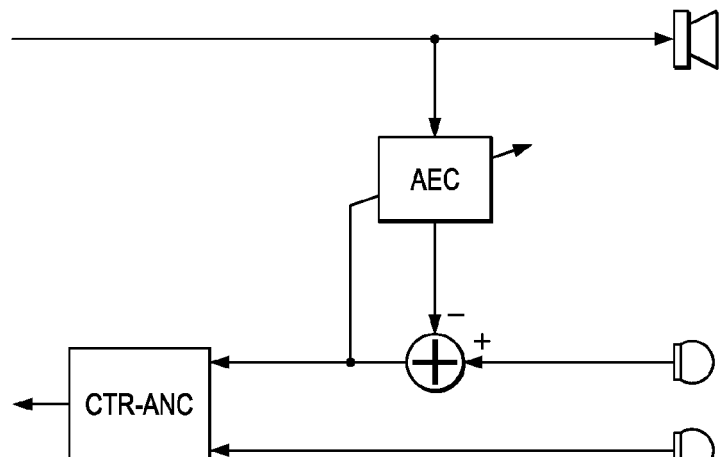
FIG. 4 is another embodiment of another cross-talk resistant adaptive noise canceller in an acoustic chain.

FIG. 3 is an embodiment of a cross-talk resistant adaptive noise canceller in the acoustic chain. FIG. 4 is another embodiment of a cross-talk resistant adaptive noise canceller in the acoustic chain. Investigating the two arrangements for the combination of the CTR-ANC and the AEC. In FIG. 3 shows the arrangement with CTR-ANC first, followed by the AEC. Whereas, FIG. 4 shows the arrangement with AEC first, followed by the CTR-ANC.

Figure 5:
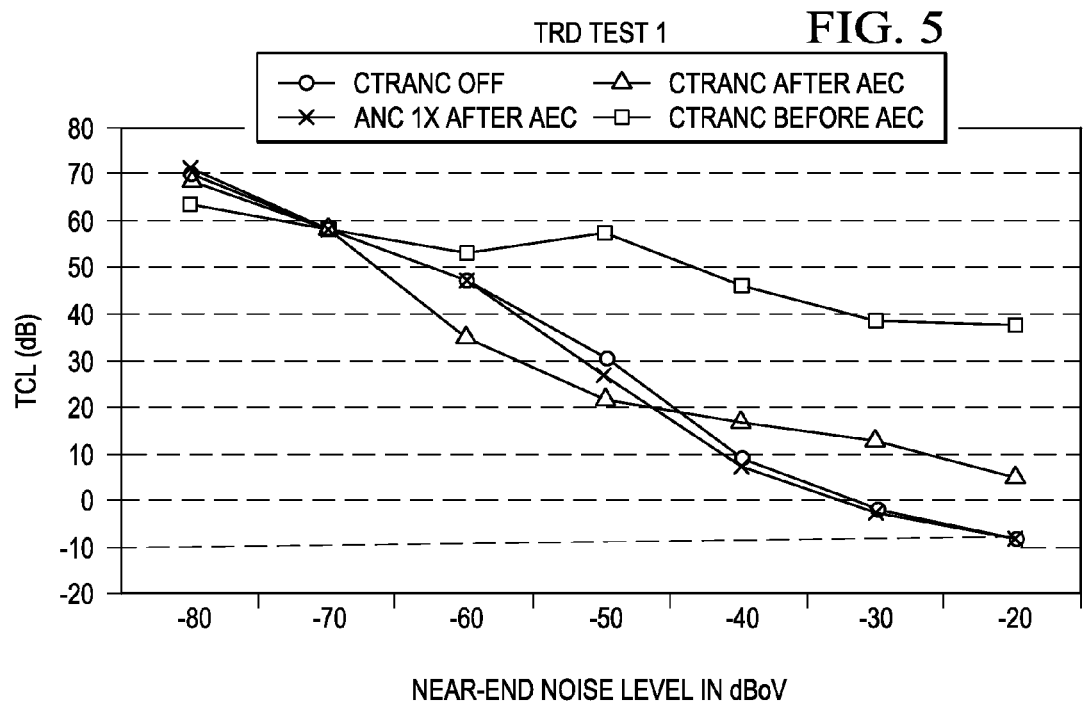
FIG. 5 is an embodiment of a test result for different noise levels utilizing the current invention.

Evaluating the two structures with the TRD test for the full acoustic chain and compared, the results with having the CTR-ANC off and using the ANC 1x after the AEC. FIG. 5 is an embodiment of a test result for different noise levels utilizing the current invention. FIG. 5 shows the results for TRD test 1, which the Terminal Coupling Loss (TCL) of the system during single talk, for varying levels of near-end noise and in handset mode.

Figure 6:
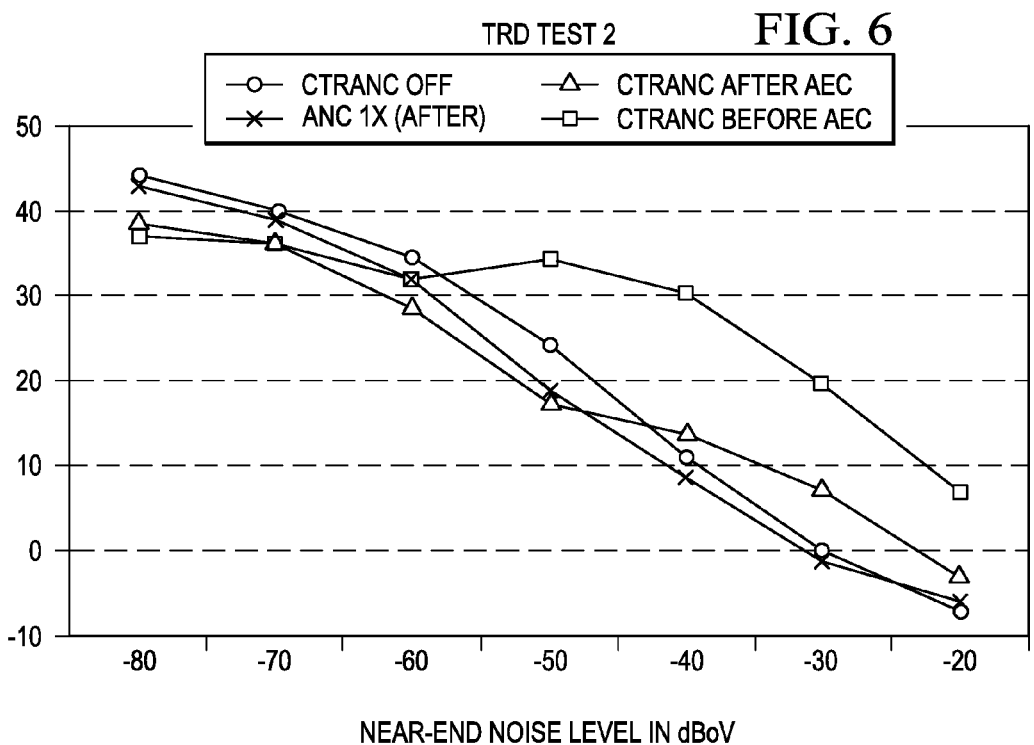
FIG. 6 is an embodiment of another test result for different noise levels utilizing the current invention.

As shown in FIG. 5, the advantage of placing the CTR-ANC in front the AEC. We get improvement of close to 30 dB in TCL improvement for high noise levels over using the AEC alone. The price to pay for this improvement is a small degradation of the AEC for very low noise conditions (−80 dBoV). In FIG. 6, we show the results for TRD test 2, which is AEC performance during double talk.

FIG. 6 is an embodiment of another test result for different noise levels utilizing the current invention. FIG. 6 shows benefits of up to 20 dB by using the CTR-ANC in front of the AEC in our acoustic system. Overall, the benefits of the CTR-ANC with the acoustic system makes it a key differentiator with algorithms such as the ANC 1x.

When evaluating the performance of the CTR-ANC or any other ANC algorithm in the presence of cross-talk, care has to be taken in balancing the SNR results with the perceptual quality. The whole idea of modeling the cross-talk is to eliminate the distortion it can have in the ANC filtering process. In our work, we evaluated our algorithm in a simulation environment and with real recording data.

The simulation environment allows control over some metrics, such as, cross-talk level, noise-leakage level, and input SNR, while maintaining a scenario as close to a real environment as possible. Starting from two signals, a noise file and speech file, two mixtures using mixing filters are generated, which were estimated from real data. Three types of tests were run to evaluate the performance of the CTR-ANC compared to the ANC 1x. Below, we define some of the metrics we used to generate our data.

Given a speech signal, s(k), and a noise signal, n(k), and mixing filters $g_{12}$ and $g_{21}$, we define the following metrics for our simulation:

1. CT, Cross-Talk (dB)

$$CT = 10\log_{10}\left(\frac{\sum (g_{12}*s)^2}{\sum (s)^2}\right)$$

2. NL, Noise-leakage (dB)

$$NL = 10\log_{10}\left(\frac{\sum (g_{21}*n)^2}{\sum (n)^2}\right)$$

3. SNR_pri, SNR at primary input (dB)

$$SNR\_pri = 10\log_{10}\left(\frac{\sum (s)^2}{\sum (g_{21}*n)^2}\right)$$

4. SNR_ref, SNR at reference input (dB)

$$SNR\_ref = 10\log_{10}\left(\frac{\sum (g_{12}*s)^2}{\sum (n)^2}\right)$$

5. Filter_sum, filter sum $$filter\_sum = \sum_{n=0}^{2N-1} |g_{12}(k)g_{21}(n-k)|$$

5. Est_filter_sum, Maximum filter sum from estimated filters $$filter\_sum = \sum_{n=0}^{2N-1} |h_{12}(k)h_{21}(n-k)|$$

FIG. 7 (A)-(D) are embodiments depicting experimental data utilizing the current invention. FIG. 7(A) depicts experiment 1, FIG. 7(B) depicts experiment 2, FIG. 7(C) depicts experiment 3 and FIG. 7(D) depicts experiment 4.

In experiment 1, we compare the SNR for the CTR-ANC with that of the ANC 1x for different SNR, while keeping the CT and NL fixed. CT and NL are picked in such a way that the filter sum is less than 1. The results are plotted for the case without post-filter filter and with post-filter, compared with the ANC 1x.

Figure 7A:
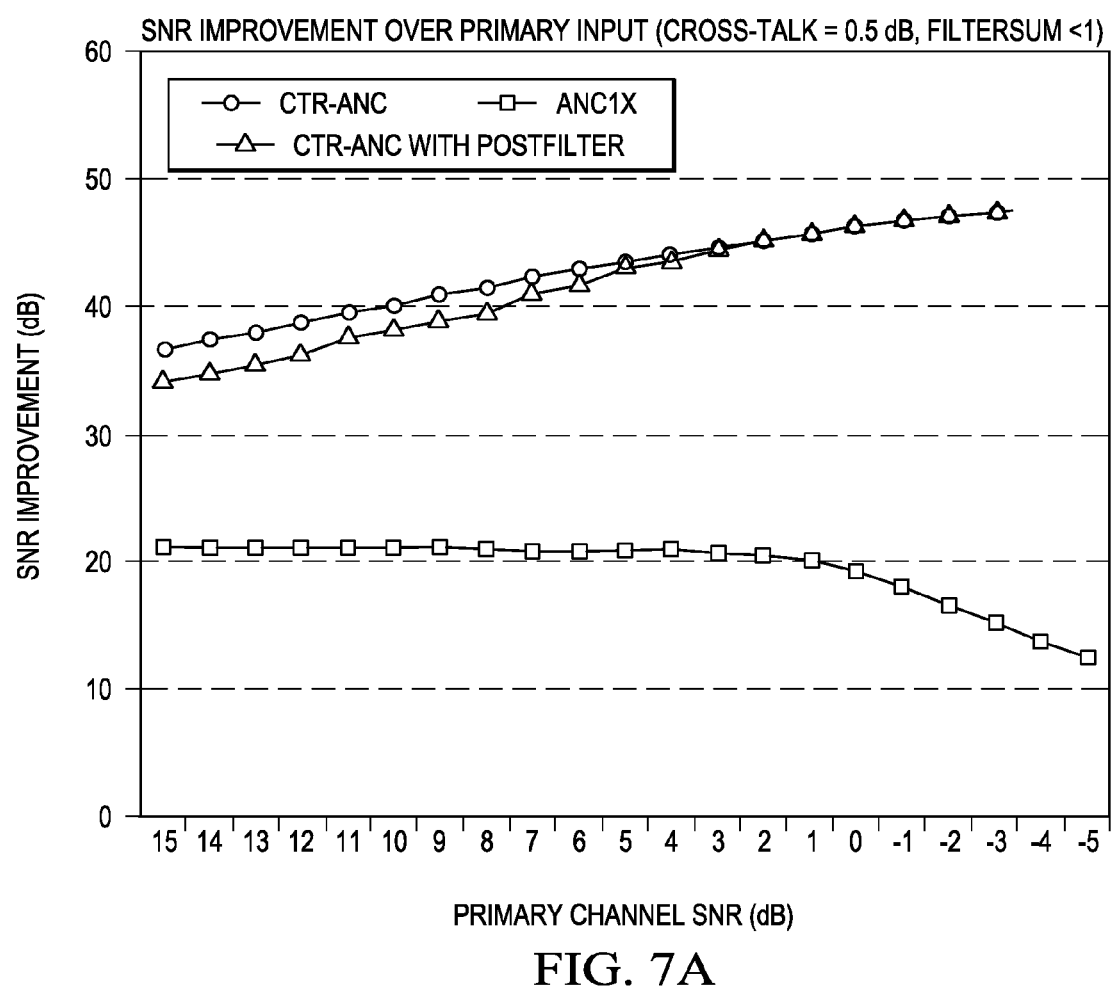
FIG. 7 (A)-(D) are embodiments depicting experimental data utilizing the current invention.
Figure 7B:
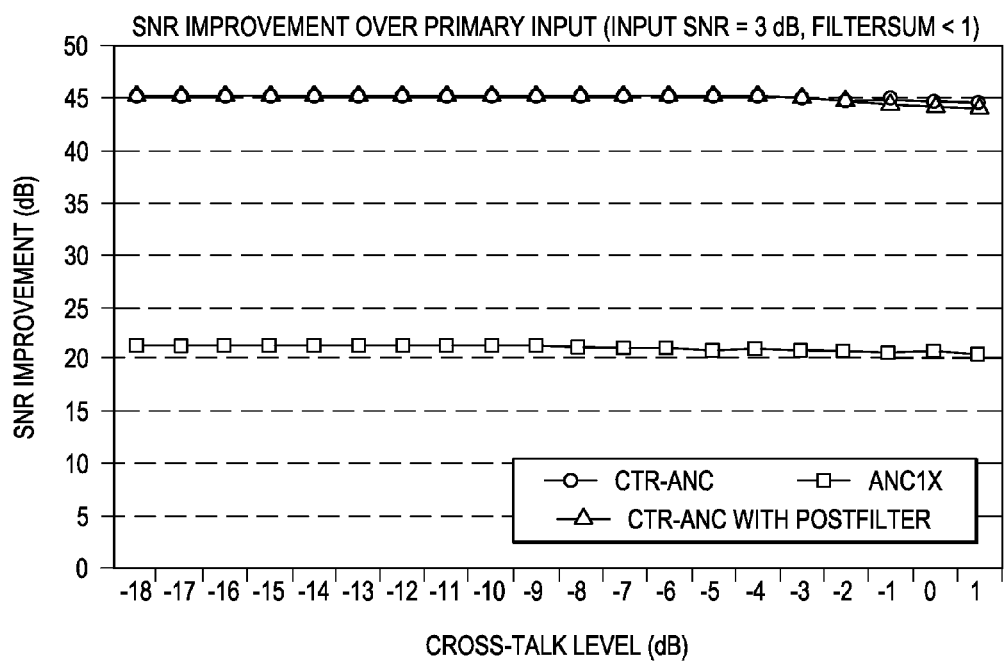
Figure 7C:
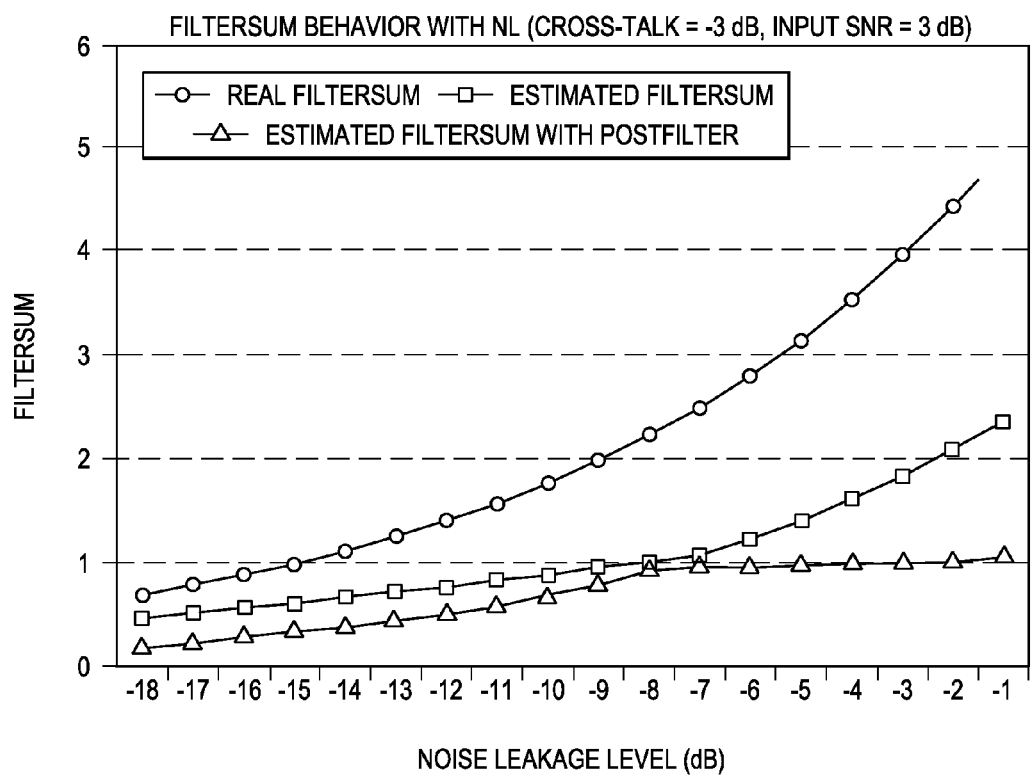
Figure 7D:
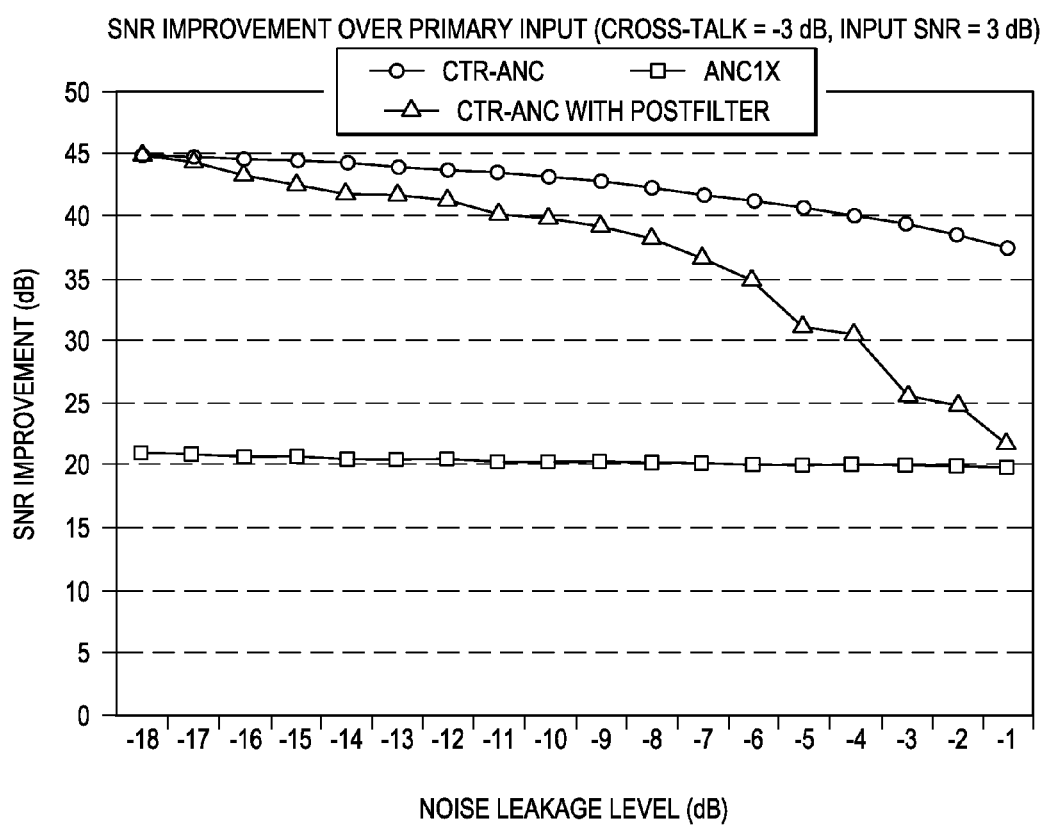

In experiment 2, we keep the input SNR and the NL constant, and change the CT level while the filter sum is still less than 1. In experiment 3, we keep the CT and SNR_pri levels constant and vary the NL level, and allow the filter sum to grow more than 1. As such, the filter sum for the different NL levels are shown in FIG. 7(C); whereas, experiment 4 shows the SNR improvement for different NL, as shown in FIG. 7(D).

We see that for the case where the filter sum is less than 1, both versions of our algorithm, with and without post-filter, gives really good separation performance, and SNR improvements. However, as we see in the above figures, when the filter sum grows larger than one, the separation quality degrades. In one embodiment, such a system may be implemented in time domain or by using block-based frequency domain implementation.

Overall, we found the CTR-ANC to provide excellent separation performance in simulation and recordings. In simulation, the CTR-ANC displayed a big improvement in SNR over the ANC 1x, while in recordings, the SNR were very close to the ANC 1x. The difference in recording data was small perceptual differences. Regarding, the source recovery, when using a post-filter, we have to compromise in quality of the separation, where more noise is leaked into the CTR-ANC output. Overall, the CTR-ANC performs better than the ANC 1x when combined with the full acoustic system as shown by the TRD results.

Figure 8:
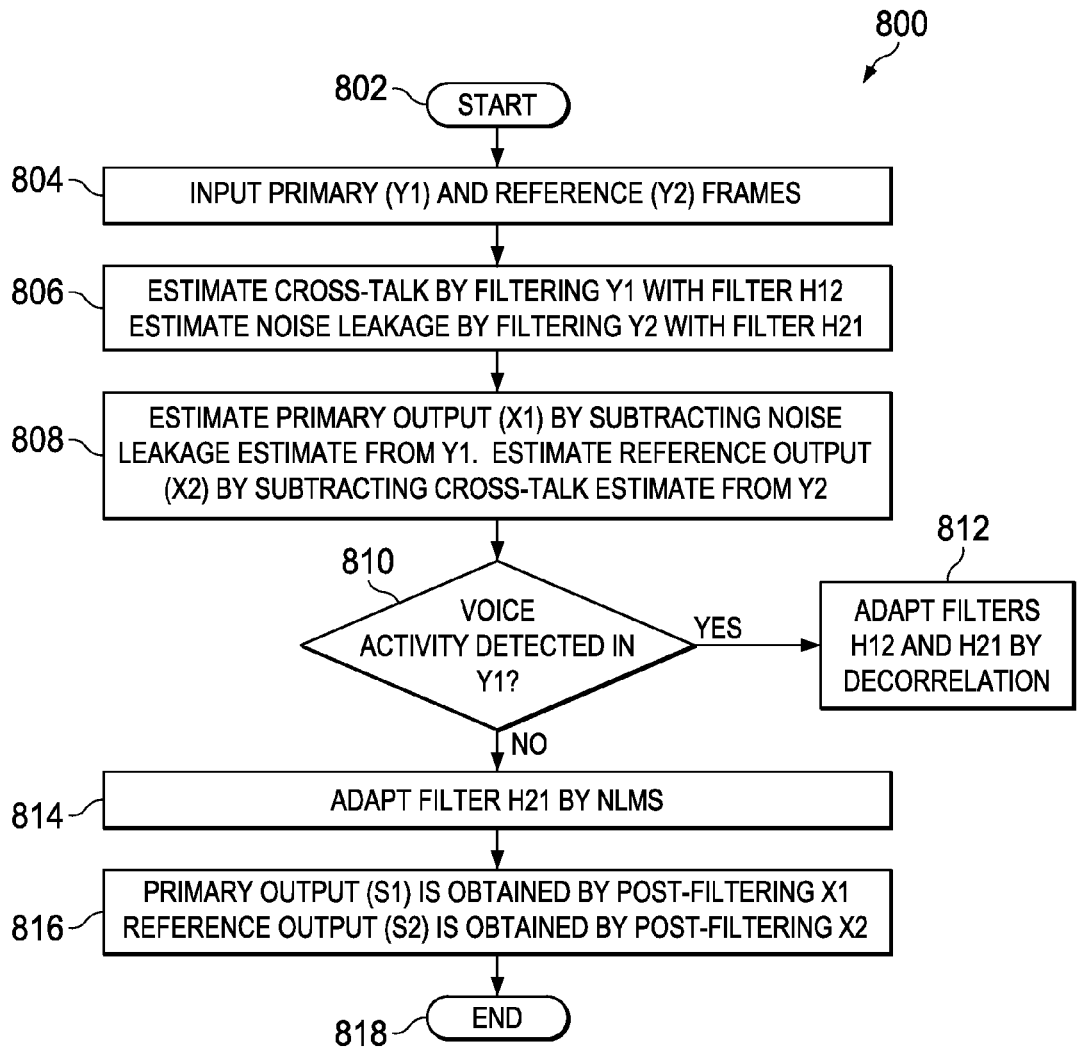
FIG. 8 is a flow diagram depicting a method for cross-talk resistant adaptive noise canceller.

FIG. 8 is a flow diagram depicting a method 800 for cross-talk resistant adaptive noise canceller. The method starts at step 802 and proceeds to step 804. At step 804, the method 800 inputs the primary signal (Y1) frame and the reference signal (Y2) frame. At step 806, the method 800 estimates the cross-talk by filtering the primary signal Y1 utilizing filter $H_{12}(z)$ and estimating the noise leakage of the reference signal (Y2) utilizing filter $H_{12}(z)$. At step 808, the method 800 estimates the primary output (X1) by subtracting the noise leakage estimate from the primary signal (Y1) and estimates the reference output (X2) by subtracting the cross-talk estimate from the reference signal (Y2).

At step 810, the method 800 determines if the voice activity is detected in the primary signal Y1. If it is detected, the method 800 proceeds to step 812, wherein the filter is adapt filters $H_{12}$ and $H_{21}$ by de-correlation. The method proceeds to step 816. Otherwise, the method 800 proceeds to step 814. At step 814, the method 800 adapts filter $H_{12}$ by NLMS. The method then proceeds to step 816. At step 816, the method 800 obtains the primary output (S1) and the reference output (S2) utilizing post-filtering X1 and X2, respectively. The method 800 ends at step 818.

While the foregoing is directed to embodiments of the present invention, other and further embodiments of the invention may be devised without departing from the basic scope thereof, and the scope thereof is determined by the claims that follow.

What is claimed is:

1. A method of a processor for cross-talk resistant adaptive noise cancelling, comprising:
   retrieving, via the processor, a primary signal and a reference signal;
   filtering the primary signal utilizing a filter $H_{12}(z)$ and estimating a cross-talk;
   filtering the reference signal utilizing a filter $H_{21}(z)$ and estimating the noise leakage of the reference signal;
   determining the difference between the noise leakage estimate from the primary signal and estimating a first post-filtering;
   determining the difference between the cross-talk estimate and the reference signal and estimating a second post-filtering;
   determining if the voice activity is detected in the primary signal;
   adapting filters $H_{12}$ and $H_{21}$ by de-correlation if the voice activity is detected, and adapting filter $H_{12}$ by NLMS if the voice activity is not detected;
   limiting maximum filter change during different conditions for protecting filters $H_{12}$ and $H_{21}$ from diverging;
   maintaining filter stability by tracking absolute sum of the coefficients of the convolution of $H_{12}$ and $H_{21}$;
   obtaining a primary output and a reference output utilizing the first post-filtering and the second post-filtering; and
   utilizing the primary output and the reference output for cross-talk resistant adaptive noise cancellation.

2. An apparatus for cross-talk resistant adaptive noise cancelling, comprising:
   means for retrieving a primary signal and a reference signal;
   means for filtering the primary signal utilizing a filter $H_{12}(z)$ and estimating a cross-talk;
   means for filtering the reference signal utilizing a filter $H_{21}(z)$ and means for estimating the noise leakage of the reference signal;
   means for determining the difference between the noise leakage and the estimate from the primary signal and means for estimating a first post-filtering;
   means for determining the difference between the cross-talk estimate and the reference signal and means for estimating a second post-filtering;
   means for determining if the voice activity is detected in the primary signal;
   means for adapting filters $H_{12}$ and $H_{21}$ by de-correlation if voice activity is detected, and means for adapting filter $H_{12}$ by NLMS if voice activity is not detected;
   means for limiting maximum filter power change for protecting filters $H_{12}$ and $H_{21}$ from diverging;
   means for maintaining stability of the system by limiting the absolute sum of the coefficients of the convolution of $H_{12}$ and $H_{21}$;
   means for obtaining a primary output and a reference output utilizing the first post-filtering and the second post-filtering; and
   means for utilizing the primary output and the reference output for cross-talk resistant adaptive noise cancellation.

3. A non-transitory computer readable medium comprising computer instructions, when executed perform a method for cross-talk resistant adaptive noise cancelling, the method comprising:
   retrieving, via the processor, a primary signal and a reference signal;
   filtering the primary signal utilizing a filter $H_{12}(z)$ and estimating a cross-talk;
   filtering the reference signal utilizing a filter $H_{21}(z)$ and estimating the noise leakage of the reference signal;
   determining the difference between the noise leakage estimate from the primary signal and estimating a first post-filtering;
   determining the difference between the cross-talk estimate and the reference signal and estimating a second post-filtering;
   determining if the voice activity is detected in the primary signal;
   adapting filters $H_{12}$ and $H_{21}$ by de-correlation if the voice activity is detected, and adapting filter $H_{12}$ by NLMS if the voice activity is not detected;
   limiting maximum filter change during different conditions for protecting filters $H_{12}$ and $H_{21}$ from diverging;
   maintaining filter stability by tracking absolute sum of the coefficients of the convolution of $H_{12}$ and $H_{21}$;
   obtaining a primary output and a reference output utilizing the first post-filtering and the second post-filtering; and
   utilizing the primary output and the reference output for cross-talk resistant adaptive noise cancellation.

* * * * *